US012698788B2

(12) United States Patent
Gerhard et al.

(10) Patent No.: US 12,698,788 B2
(45) Date of Patent: Aug. 4, 2026

(54) HYDRAULIC SYSTEM HAVING A CONDITIONING CIRCUIT

(71) Applicant: Robert Bosch GmbH, Stuttgart (DE)

(72) Inventors: Oliver Gerhard, Zellingen (DE); Jim E. Diehl, Lehighton, PA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/990,802

(22) Filed: Dec. 20, 2024

(65) Prior Publication Data

US 2026/0177085 A1 Jun. 25, 2026

(51) Int. Cl.

| | |
|---|---|
| ***F15B 21/041*** | (2019.01) |
| ***F15B 21/0423*** | (2019.01) |
| ***F15B 21/14*** | (2006.01) |
| *E02F 9/22* | (2006.01) |
| *F15B 11/08* | (2006.01) |

(52) U.S. Cl.

CPC ........ *F15B 21/041* (2013.01); *F15B 21/0423* (2019.01); *F15B 21/14* (2013.01); *E02F 9/2289* (2013.01); *E02F 9/2292* (2013.01); *E02F 9/2296* (2013.01); *F15B 11/08* (2013.01); *F15B 2211/20515* (2013.01); *F15B 2211/20546* (2013.01); *F15B 2211/20561* (2013.01); *F15B 2211/615* (2013.01); *F15B 2211/62* (2013.01)

(58) Field of Classification Search

CPC .... F15B 21/041; F15B 21/0423; F15B 21/14; F15B 11/08; F15B 2211/20515; F15B 2211/20546; F15B 2211/20561; F15B 2211/615; F15B 2211/62; E02F 9/2289; E02F 9/2292; E02F 9/2296

See application file for complete search history.

(56) References Cited

U.S. PATENT DOCUMENTS

| | | | | |
|---|---|---|---|---|
| 6,460,332 | B1 * | 10/2002 | Maruta | E02F 9/2217 60/484 |
| 7,658,065 | B2 * | 2/2010 | Smith | F15B 21/14 60/414 |
| 7,856,816 | B2 | 12/2010 | Duray | |

(Continued)

FOREIGN PATENT DOCUMENTS

| | | | | |
|---|---|---|---|---|
| CN | 118257750 | * | 6/2024 | F15B 21/14 |

*Primary Examiner* — Dustin T Nguyen

(74) *Attorney, Agent, or Firm* — Maginot, Moore & Beck LLP

(57) ABSTRACT

A hydraulic system includes a hydraulic circuit having a hydraulic machine, a hydraulic consumer, and a first hydraulic line fluidically connecting the hydraulic machine to the hydraulic consumer. The hydraulic system further includes a conditioning circuit having a hydraulic motor configured to withdraw a portion of hydraulic fluid flowing in the first hydraulic line from the hydraulic machine to the hydraulic consumer, the hydraulic motor configured to capture energy from the portion of hydraulic fluid, a conditioning arrangement downstream of the hydraulic motor and configured to condition the portion of hydraulic fluid, and a hydraulic pump arranged downstream of the conditioning arrangement and configured to pump the portion of hydraulic fluid into the first hydraulic line, the hydraulic pump being operably connected to the hydraulic motor and configured to operate at least partially using the energy captured by the hydraulic motor.

9 Claims, 2 Drawing Sheets

(56) References Cited

U.S. PATENT DOCUMENTS

| | | | | |
|---|---|---|---|---|
| 8,468,818 | B2 | 6/2013 | Hyodo et al. | |
| 8,720,197 | B2 * | 5/2014 | Persson | E02F 9/2217 60/476 |
| 9,759,317 | B2 * | 9/2017 | Stammen | F15B 7/006 |
| 9,803,339 | B2 * | 10/2017 | Nanjo | E02F 9/2292 |
| 9,926,951 | B2 * | 3/2018 | Ooki | F15B 21/14 |
| 10,215,275 | B2 | 2/2019 | Le Dren et al. | |
| 10,584,722 | B2 * | 3/2020 | Hijikata | F15B 11/165 |
| 11,459,732 | B2 * | 10/2022 | Vigholm | E02F 9/0841 |
| 11,846,086 | B2 * | 12/2023 | Vigholm | F15B 21/14 |
| 2008/0238187 | A1 | 10/2008 | Garnett et al. | |
| 2009/0077837 | A1 * | 3/2009 | Tozawa | E02F 9/2075 37/361 |
| 2024/0094689 | A1 | 3/2024 | Börgel et al. | |

* cited by examiner

HYDRAULIC SYSTEM HAVING A CONDITIONING CIRCUIT

FIELD

This disclosure relates generally to hydraulic systems, and, more particularly, to conditioning circuits for hydraulic systems.

BACKGROUND

Hydraulic systems generate heat and contaminants in the hydraulic fluid while operating. As such, conventional hydraulic systems include arrangements that perform conditioning, e.g. cooling and filtering, of the fluid while the system is in operation. In a closed loop hydraulic system, for example, a portion of the fluid is removed from the primary circuit, the conditioning processes are performed on this fluid portion in an auxiliary circuit, and the fluid is returned back to the primary circuit using a charge pump. In conventional hydraulic systems, a control valve is typically used for the managed removal of the hydraulic fluid and associated pressure reduction going to the auxiliary circuit. However, removal of fluid from the primary circuit, which has a high pressure, to the auxiliary circuit, which has a relatively low pressure, results in a power loss in the conventional hydraulic system. This loss in energy must be compensated for by the charge pump, which reduces overall system efficiency. As a result, it would be beneficial to provide a conditioning system that reduces efficiency losses in the hydraulic circuit.

SUMMARY

In some aspects, the techniques described herein relate to a hydraulic system including: a hydraulic circuit including: a hydraulic machine; a hydraulic consumer; and a first hydraulic line fluidically connecting the hydraulic machine to the hydraulic consumer; and a conditioning circuit including: a hydraulic motor configured to withdraw a portion of hydraulic fluid flowing in the first hydraulic line from the hydraulic machine to the hydraulic consumer, the hydraulic motor configured to capture energy from the portion of hydraulic fluid; a conditioning arrangement downstream of the hydraulic motor and configured to condition the portion of hydraulic fluid; and a hydraulic pump arranged downstream of the conditioning arrangement and configured to pump the portion of hydraulic fluid into the first hydraulic line, the hydraulic pump being operably connected to the hydraulic motor and configured to operate at least partially using the energy captured by the hydraulic motor.

In some aspects, the techniques described herein relate to a conditioning circuit for a hydraulic system including: a hydraulic motor configured to withdraw a portion of hydraulic fluid flowing in a hydraulic line of the hydraulic system, the hydraulic motor configured to capture energy from the portion of hydraulic fluid; a conditioning arrangement downstream of the hydraulic motor and configured to condition the portion of hydraulic fluid; and a hydraulic pump arranged downstream of the conditioning arrangement and configured to pump the portion of hydraulic fluid into the hydraulic line, the hydraulic pump being operably connected to the hydraulic motor and configured to operate at least partially using the energy captured by the hydraulic motor.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
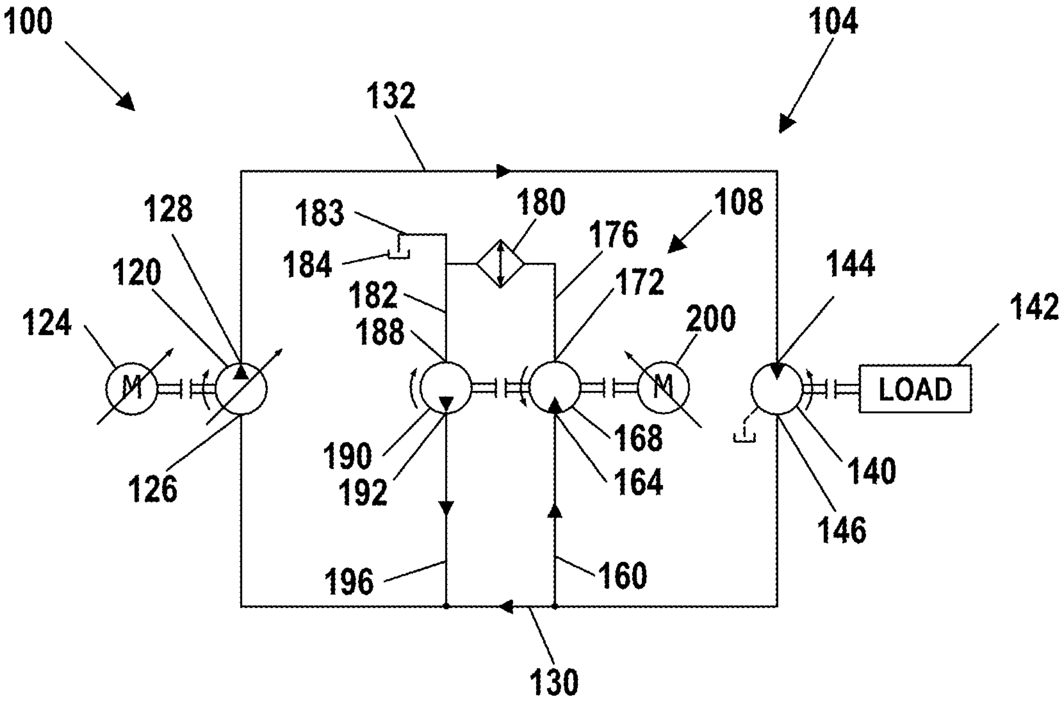
FIG. 1 is a schematic view of a hydraulic system having a conditioning circuit according to the disclosure.

FIG. 1 depicts a schematic diagram of a hydraulic drive 100 (also referred to as a hydraulic unit) having a primary hydraulic circuit 104, which is configured as a closed loop hydraulic circuit, and a conditioning circuit 108. The conditioning circuit 108 is configured to efficiently remove heat and contaminants from the primary hydraulic circuit 104.

The primary hydraulic circuit 104 includes a hydraulic machine 120, which may be, in particular, a variable hydraulic pump or a pump/motor (i.e., a hydraulic machine configured to act both as a hydraulic pump and as a hydraulic motor), and which is driven by a drive motor 124, which, in embodiments using a hydraulic pump/motor, may be operated both as a motor and as a generator. Alternatively, in some embodiments, the variable hydraulic machine 120 is a fixed displacement pump or pump/motor. The drive motor 124 may be an internal combustion engine, an electric motor, a hybrid motor, or another desired driving arrangement.

The hydraulic machine 120 includes a first port 126 and a second port 128, which are respectively connected to a first hydraulic line 130 and a second hydraulic line 132 of the primary hydraulic circuit 104. The hydraulic machine 120 may be, for example, an axial piston machine with a variable swing angle or variable displacement. In the illustrated embodiment, the hydraulic machine is operable in only one direction and, for example, draws fluid from the first hydraulic line 130, serving as a low-pressure line, via the first port 126, serving as a suction port, and delivers pressurized hydraulic fluid to the second hydraulic line 132, serving as a high-pressure line, via the second port 128, which serves as a pressure port. In some embodiments, the variable swing angle or variable displacement of the hydraulic machine 120 is adjustable through zero, i.e., the direction of the volumetric flow of the hydraulic fluid through the hydraulic machine 120 is reversible, while the direction of rotation of a drive shaft of the hydraulic machine 120 or drive motor 124 remains unchanged, so that, via corresponding control, the hydraulic fluid flows from the second hydraulic line 132 (the B side) via the hydraulic machine 120 to the first hydraulic line 130 (the A side), or from the first hydraulic line 130 (the A side) via the hydraulic machine 120 to the second hydraulic line 132 (the B side).

In embodiments with a non-variable hydraulic machine (e.g., constant hydraulic machine) having a fixed swing angle or fixed displacement, the hydraulic machine 120 may be drivable at a variable rotational speed, and in some embodiments, in different directions of rotation. As a result, at a fixed swing angle or fixed displacement, the volumetric flow of the hydraulic fluid can be varied by the rotational speed driving the hydraulic machine 120 so that the amount of volumetric flow from the first hydraulic line 130 to the second hydraulic line 132 is variable.

Figure 2:
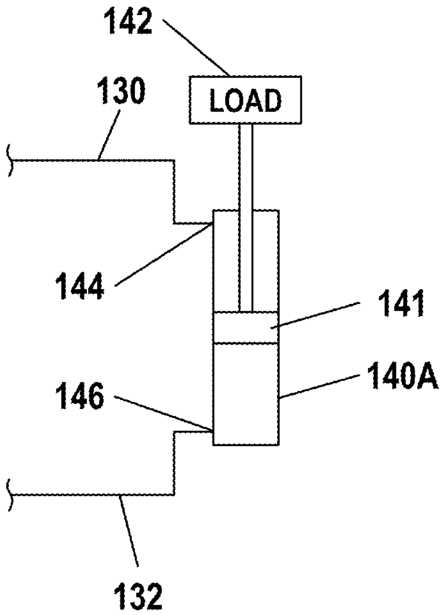
FIG. 2 is a schematic view of another hydraulic consumer of the hydraulic system of FIG. 1.

The primary hydraulic circuit 104 pressurizes a hydraulic consumer 140, shown in the embodiment of FIG. 1 as a unidirectional hydraulic motor, which is mechanically connected to a load 142, which may be for example a conveyor, drive wheels or tracks, an implement, an external power take-off, or the like. In some embodiments, the hydraulic consumer 140 may instead be a bidirectional hydraulic motor that is drivable in forward and reverse directions. In another embodiment, shown schematically in FIG. 2, the hydraulic consumer 140A may instead be a hydraulic cylinder with a piston 141 that is connected to at least one load 142. In the illustrated embodiment, the primary hydraulic circuit 104 is configured such that the hydraulic machine 120 pumps hydraulic fluid via the second hydraulic line 132 to a first side 144 of the hydraulic consumer 140 while simultaneously diverting hydraulic fluid from a second side 146 of the consumer via the first hydraulic line 130.

During the operation of the hydraulic drive 100, the hydraulic machine 120 and hydraulic consumer 140 generate heat in the hydraulic fluid flowing through the primary hydraulic circuit 104. Further, contaminants may be introduced into the hydraulic fluid by the components in the primary hydraulic circuit 104. As a result, the hydraulic drive 100 includes the conditioning circuit 108, which is configured to condition the hydraulic fluid by removing heat and contaminants present therein.

The conditioning circuit 108 includes a pressure inlet line 160, which receives hydraulic fluid from the low-pressure side of the primary hydraulic circuit 104, in particular from the first hydraulic line 130, and directs the fluid to an inlet port 164 of a hydraulic motor 168. The hydraulic motor 168 captures the energy present in the hydraulic fluid, and the hydraulic fluid, now at or near atmospheric pressure, is then output via the outlet port 172 of the hydraulic motor 168 into a low-pressure line 176.

The low-pressure hydraulic fluid in the low-pressure line 176 is then directed to a conditioning arrangement 180. The conditioning arrangement 180 includes a heat dissipator, i.e. air or liquid cooled heat sink, thermoelectric cooler, refrigeration circuit, or the like, configured to remove heat from the hydraulic fluid. Additionally, the conditioning arrangement 180 includes and at least one filter, which may include for example a mechanical filter (e.g. screen or porous membrane), a chemical filter, a sediment filter, or any other desired filter, configured to remove foreign particles from the hydraulic fluid.

The conditioned hydraulic fluid continues to a pump inlet line 182, which is also connected to a hydraulic reservoir 184 via a reservoir connection line 183. A portion of the conditioned hydraulic fluid may be deposited in the hydraulic reservoir 184 or, alternatively, fluid may be drawn from the hydraulic reservoir 184 into the pump inlet line 182. The pump inlet line 182 flows into a pump inlet 188 of a hydraulic pump 190. The hydraulic pump 190 pumps the hydraulic fluid via a pump outlet line 196 back to the first hydraulic line 130 at or near the pressure in the first hydraulic line 130. As such, the pressure in the first hydraulic line 130 upstream of the pressure inlet line 160 is substantially the same as the pressure in the first hydraulic line 130 downstream of the pump outlet line 196.

The hydraulic pump 190 is operably connected to the 168 so as to receive at least a portion of the energy captured by the hydraulic motor 168. In the illustrated embodiment, the hydraulic pump 190 is mechanically linked to the hydraulic motor 168 such that the output shaft of the hydraulic motor 168 is directly or indirectly (i.e. via, for example, a gearing) connected to the input shaft of the hydraulic pump 190. As a result, energy generated by the fluid flowing through the hydraulic motor 168, which is at a pressure greater than atmospheric pressure, causes the hydraulic pump 190 to rotate and pump the hydraulic fluid back into the first hydraulic line 130 at a pressure that is substantially equal to the pressure in the first hydraulic line 130 upstream of the pressure inlet line 160. The losses in the conditioning circuit 108 are therefore limited to the volumetric and efficiency losses of the hydraulic motor 168 and hydraulic pump 190. An electric motor 200, which provides additional energy to the hydraulic pump 190, and the hydraulic fluid in the hydraulic reservoir 184 compensate for the energy and volumetric losses in the hydraulic motor 168 and hydraulic pump 190. In some embodiments, the drive motor 124 may be connected to the hydraulic pump 190 to compensate for the losses in the hydraulic motor 168 and hydraulic pump 190 instead of a separate electric motor.

Figure 3:
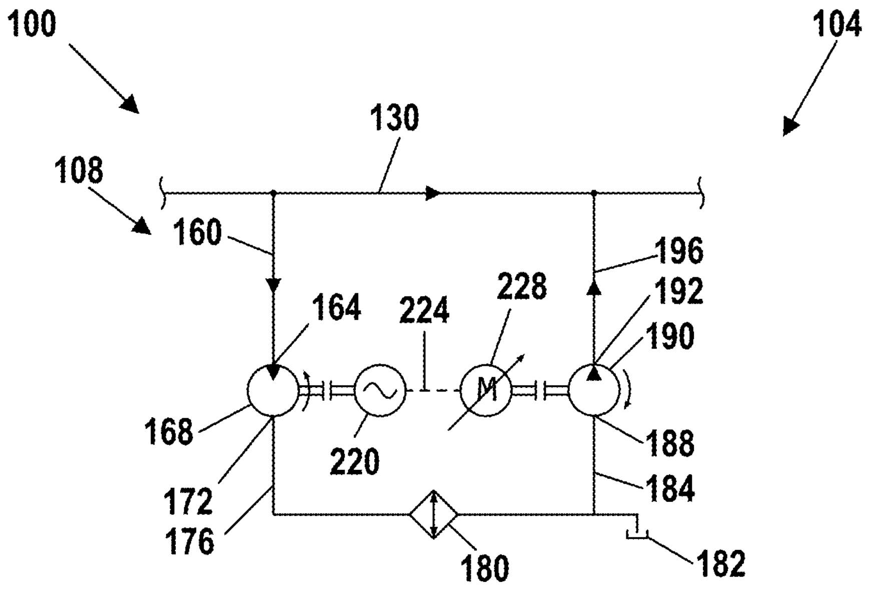
FIG. 3 is a schematic view of another conditioning circuit of the hydraulic system of FIG. 1.

In another embodiment, depicted in FIG. 3, the hydraulic motor 168 is instead electrically linked to power the hydraulic pump 190. In particular, the hydraulic motor 168 is mechanically connected to an electric generator 220, which generates electrical energy from the mechanical rotation of the hydraulic motor 168. The electrical energy from the electric generator 220 is transmitted via an electrical line 224 to an electric motor 228, which converts the electrical energy back to mechanical energy. The mechanical energy from the electric motor 228 operates the hydraulic pump 190 to pump the hydraulic fluid back into the first hydraulic line 130. The reader should appreciate that the electrical energy from the electric generator 220 may be stored in a battery that is in the electrical line 224 between the electric generator 220 and the electric motor 228.

In some embodiments, the conditioning circuit 108 may be connected to both the first and second hydraulic lines 130, 132 via respective valve arrangements, which may include one or more check valves, hydraulic or solenoid operated control valves, selector valves, or the like to selectively connect the conditioning circuit 108 to one of the first and second hydraulic lines 130, 132. For example, in embodiments in which the hydraulic machine 120 is a bidirectional hydraulic pump, the valve arrangement may be configured to selectively connect the conditioning circuit 108 to the one of the first and second hydraulic lines 130, 132 that has lower pressure, i.e. is on the suction side of the hydraulic machine 120, at any given time so that the conditioning circuit 108 withdraws hydraulic fluid from the primary hydraulic circuit 104 downstream of the hydraulic consumer 140 and returns the hydraulic fluid to the primary hydraulic circuit 104 upstream of the hydraulic machine 120. Alternatively, in some embodiments, the conditioning circuit 108 may be connected to the high-pressure hydraulic line in either a unidirectional or bidirectional hydraulic system.

The conditioning circuit 108 disclosed herein therefore allows for the conditioning by, for example, cooling and filtering, of the hydraulic fluid from the high-pressure side of the primary hydraulic circuit 104. Since the potential energy in the hydraulic fluid removed from the primary hydraulic circuit 104 is captured by the hydraulic motor 168 and returned to the hydraulic fluid before it is reinserted into the primary hydraulic circuit 104, the energy losses through the conditioning circuit 108 are significantly lower than in conventional hydraulic systems. As a result, the hydraulic drive 100 is more energy efficient than conventional hydraulic systems.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:

1. A hydraulic system comprising:

a closed-loop hydraulic circuit comprising:

a hydraulic machine;

a hydraulic consumer; and a first hydraulic line fluidically connecting the hydraulic machine to the hydraulic consumer; and a conditioning circuit comprising:

a hydraulic motor configured to withdraw a portion of hydraulic fluid flowing in the first hydraulic line, the hydraulic motor configured to capture energy from the portion of hydraulic fluid;

a conditioning arrangement downstream of the hydraulic motor and configured to condition the portion of hydraulic fluid;

a hydraulic pump arranged downstream of the conditioning arrangement and configured to pump the portion of hydraulic fluid into the first hydraulic line, the hydraulic pump being operably connected to the hydraulic motor and configured to operate at least partially using the energy captured by the hydraulic motor; and an electric motor operably connected to the hydraulic pump and configured to drive the hydraulic pump, wherein the electric motor is separate from a drive motor that drives the hydraulic machine.

2. The hydraulic system of claim 1, wherein the hydraulic pump is further mechanically connected to the hydraulic motor such that both the hydraulic motor and the electric motor drive the hydraulic pump.

3. The hydraulic system of claim 1, wherein the conditioning circuit further comprises an electric generator connected to the hydraulic motor and configured to generate electrical energy from the captured energy, the electric generator being operably connected to the electric motor and configured to supply the electrical energy to the electric motor to drive the hydraulic pump.

4. The hydraulic system of claim 1, wherein the conditioning circuit further comprises a reservoir connection line fluidly connected between the conditioning arrangement and the hydraulic pump.

5. The hydraulic system of claim 1, wherein the closed-loop hydraulic circuit further comprises a second hydraulic line connecting the hydraulic machine to the hydraulic consumer.

6. A conditioning circuit for a closed-loop hydraulic system comprising:

a hydraulic motor configured to withdraw a portion of hydraulic fluid flowing in a hydraulic line of the closed-loop hydraulic system, the hydraulic motor configured to capture energy from the portion of hydraulic fluid;

a conditioning arrangement downstream of the hydraulic motor and configured to condition the portion of hydraulic fluid;

a hydraulic pump arranged downstream of the conditioning arrangement and configured to pump the portion of hydraulic fluid into the hydraulic line, the hydraulic pump being operably connected to the hydraulic motor and configured to operate at least partially using the energy captured by the hydraulic motor; and an electric motor operably connected to the hydraulic pump and configured to drive the hydraulic pump, wherein the electric motor is separate from a drive motor that drives a hydraulic machine of the closed-loop hydraulic system.

7. The conditioning circuit of claim 6, wherein the hydraulic pump is further mechanically connected to the hydraulic motor such that both the hydraulic motor and the electric motor drive the hydraulic pump.

8. The conditioning circuit of claim 6, further comprising an electric generator connected to the hydraulic motor and configured to generate electrical energy from the captured energy, the electric generator being operably connected to the electric motor and configured to supply the electrical energy to the electric motor to drive the hydraulic pump.

9. The conditioning circuit of claim 6, further comprising a reservoir connection line fluidly connected between the conditioning arrangement and the hydraulic pump.

* * * * *